INVENTOR:
WILHELM NOLL

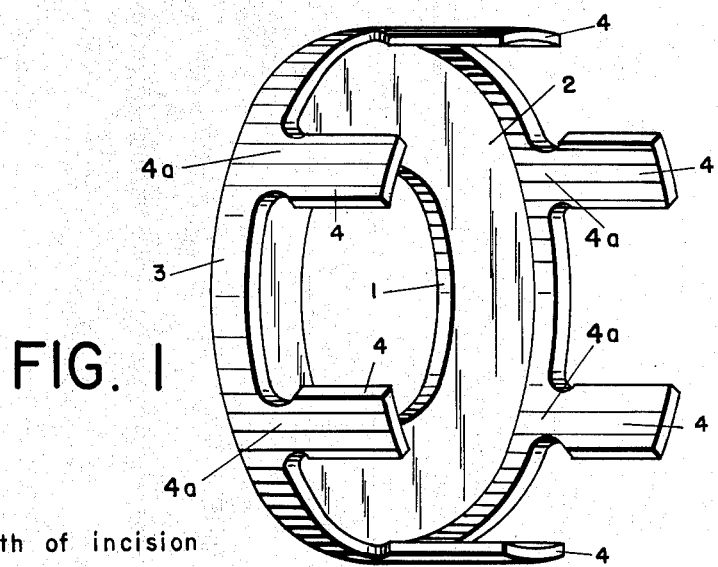
FIG. 1
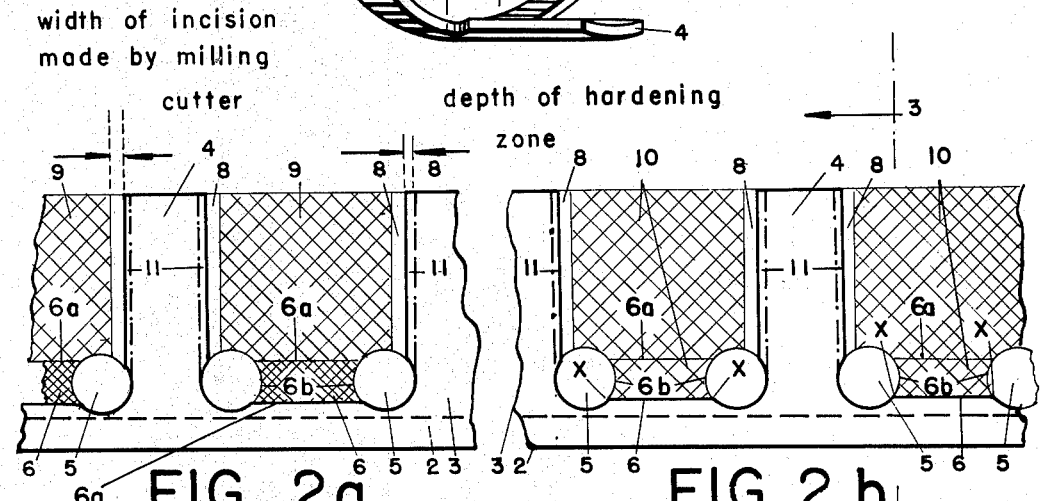
width of incision made by milling cutter
depth of hardening zone
FIG. 2a
FIG. 2b
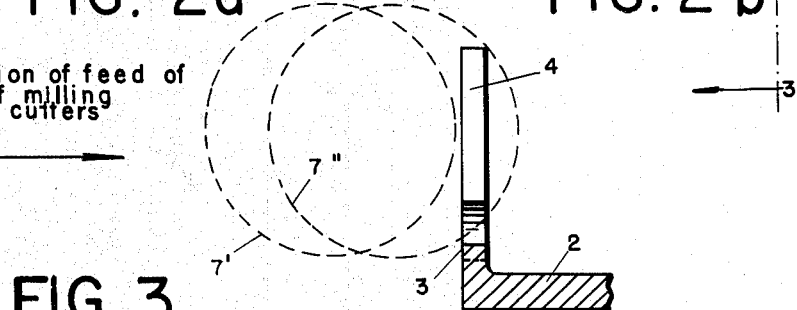
direction of feed of pair of milling cutters
FIG. 3
INVENTOR:
WILHELM NOLL

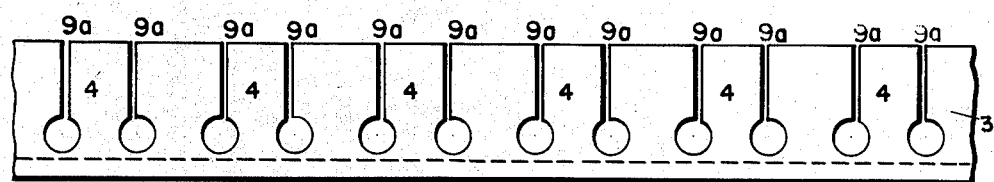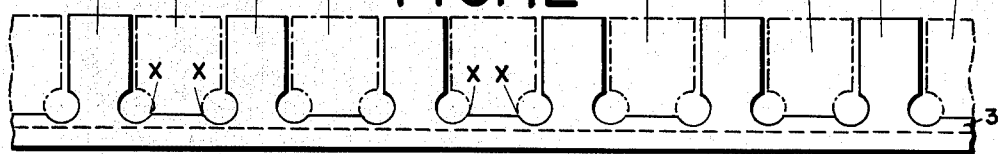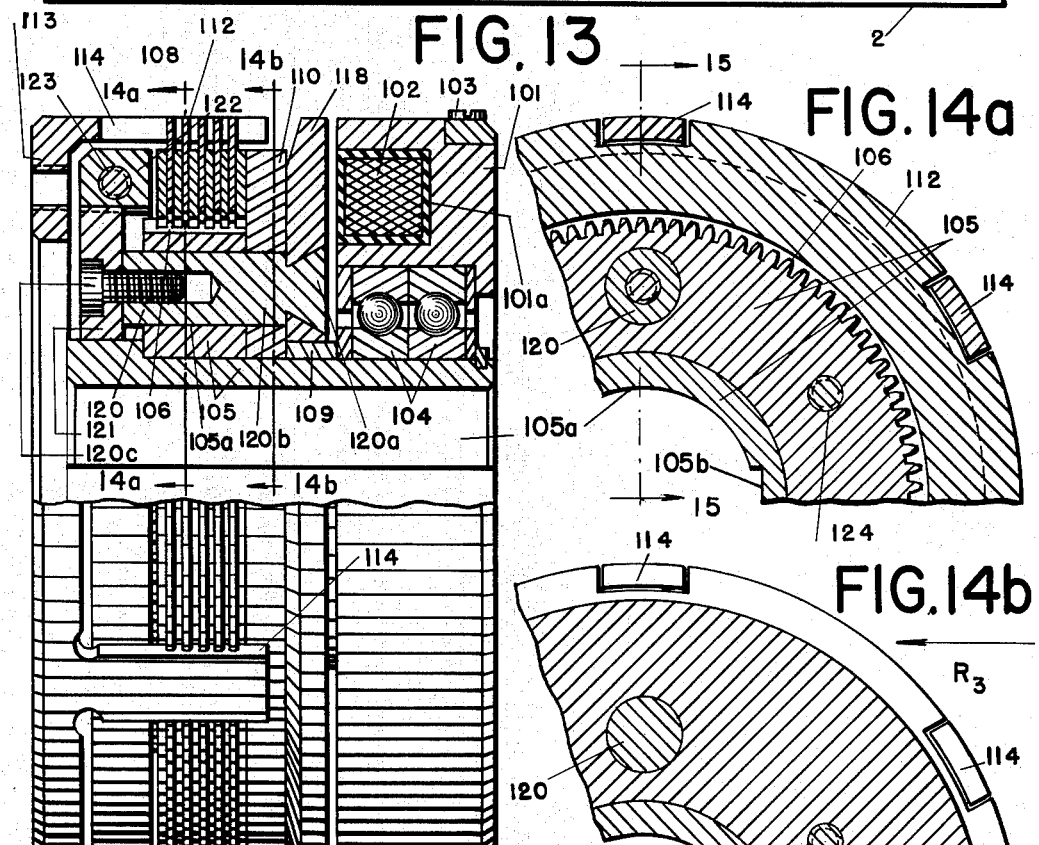
INVENTOR:
WILHELM NOLL
BY       ATTY.

3,224,242
PROCESS FOR MANUFACTURING CASINGS FOR LAMINATED DISC CLUTCHES AND LAMINATED DISC BRAKES
Wilhelm Noll, Unna, Westphalia, Germany, assignor to Maschinenfabrik Stromag G.m.b.H., Unna, Westphalia, Germany, a firm of Germany
Filed Sept. 4, 1962, Ser. No. 221,168
Claims priority, application Germany, Oct. 18, 1961, M 50,612/61
5 Claims. (Cl. 72—340)

This invention relates to apparatus in the nature of laminated disc couplings, and more particularly to laminated disc clutches and laminated disc brakes.

As seen from a more specific point of view this invention relates to a process for manufacturing casings for laminated disc clutches and laminated disc brakes, and in particular to a process for manufacturing casings designed to guide the torque-transmitting laminations of laminated disc clutches or brakes, or lamination guide casings.

Laminated disc clutches and laminated disc brakes may be operated either mechanically, hydraulically, pneumatically or electromagnetically, and the process according to the present invention may be applied to manufacturing casings of the lamination guide type irrespective of the particular mode in which the particular clutch or brake is operated.

Casings of the lamination guide type are generally pot-shaped, i.e., comprise a substantially disc-shaped end surface and lateral angularly spaced torque-transmitting fingers projecting from said end surface and generally arranged to define a cylindrical surface. That portion of the torque-transmitting fingers immediately adjacent to the points where the substantially flat disc-shaped end surface bends 90 degrees into the cylindrical surface in which the torque-transmitting fingers are located may be referred to as the roots of the torque-transmitting fingers, and will hereinafter be so referred to. The roots of the torque-transmitting fingers are points of reduced cross-sectional area. Each pair of contiguous spaced torque-transmitting fingers defines a slot which is open at one end, and closed at the other end thereof situated immediately adjacent the flat disc-shaped end surface of the lamination guide casing. The closed ends of these slots are substantially circular, i.e., they are formed by a cylindrical edge surface having a small height equal to the width of the material of which the lamination guide casing is made and the aforementioned points of reduced cross-sectional area at the roots of torque-transmitting fingers are located between the two cylindrical edge surfaces of each such finger. The lateral edges or flanks of the torque-transmitting fingers form tangents to the aforementioned circular or cylindrical slot ends.

Manufacturing such lamination guide casings has been heretofore an extremely critical process involving much time and high cost and resulting in structures which were virtually never entirely satisfactory. It is, therefore, a general object of this invention to provide a manufacturing process for lamination guide casings which is free from the aforementioned limitations or drawbacks.

Lamination guide casings were heretofore generally made from a block of rolled iron by turning the outer surface thereof, and by turning a substantially cylindrical cavity into it, so as to impart a substantially pot-shaped geometry to the block of rolled iron. The direction of the grain is axial throughout any lamination guide casing made in this fashion, i.e., it extends in the direction of the fingers and does not follow the contours of the structure or, to be more specific, it does not bend 90 degrees from the lateral cylindrical surface into the flat end surface, and does not extend radially in the flat end surface. Because of this fact, i.e., because the direction of the grain is the same and axial both in the lateral cylindrical finger-forming surface of the structure as well as in the flat end or bottom surface thereof, the structure lacks the mechanical integrity and mechanical strength it should have in order to comply with the highest requirements which may be made upon it. To be more specific, lamination guide casings which are made in the aforementioned fashion from a block of rolled stock by turning or machining in a lathe lack in bending strength, and this criticism applies particularly to their torque-transmitting fingers.

It is another object of this invention to provide a method for manufacturing lamination guide casings for clutches and brakes which is free from all the disadvantages inherent in the above-referred to conventional method for manufacturing such parts.

A particular difficulty in manufacturing lamination guide casings consists in imparting a perfectly smooth surface to the portions of such a structure along which the cooperating laminations of the clutch or brake are supposed to slide axially. The lateral cylindrical surface of the casing being relatively thin, this portion tends to vibrate during machining thereof, resulting in chatter marks, or unevenness of the machined surface. This, in turn, tends to impede perfect or unobstructed sliding of the laminations engaging the particular surface of the casing. Such chatter marks must be removed by careful grinding of the uneven surface. The danger of vibrations and resulting chatter marks is particularly high when the torque-transmitting fingers are formed by axially milling axial slots into the thin solid cylindrical lateral surface of a workpiece out of which a lamination guide casing is to be made.

Space and other design consideration require that the thickness of the torque-transmitting fingers in radial direction be relatively limited. Because of the limited thickness of the torque-transmitting fingers in radial direction and because of the limited thickness of the torque-transmitting laminations engaging the torque-transmitting fingers, the specific pressures at the points of engagement between the fingers and the laminations tend to be very high. During operation of a clutch or brake the edges of the torque-transmitting laminations are being thrown with considerable impact against the ground edges or flanks of the torque-transmitting fingers. This hammering action tends to impair the ground edges or flanks of the torque-transmitting fingers and thus to limit ready axial slidability of the torque-transmitting laminations relative to the torque-transmitting fingers. Ready axial slidability of these parts is, however, a feature which is of crucial importance in regard to the proper operation of any disc clutch, disc brake, or like apparatus, specially as far as the release operation thereof is concerned. Hence, in order to avoid impairment of, or damage to, the torque-transmitting edges or flanks of the torque-transmitting fingers, it has become necessary to harden these edges or flanks. The hardening zones include the points where the surface of the torque-transmitting flanks of the torque-transmitting fingers form a tangent to the circular or cylindrical ends of the slots between contiguous torque-transmitting fingers and encompass the reduced cross-section roots of the torque-transmitting fingers. These areas of lamination guide casings are subjected to relatively severe shear and bending stresses during the operation of any particular disc clutch, or disc brake. These stresses change in direction, and tend to result in fatigue of the material, notch effects in the region of the roots of the torque-transmitting fingers and consequent shortening of the life of the lamination guide casing.

No entirely satisfactory remedy has been found to-date for avoiding these severe drawbacks of prior art disc clutches and disc brakes.

It is, therefore, another object of this invention to provide a method for manufacturing casings of the lamination guide type for disc clutches, disc brakes, and like apparatus which are entirely free from the above referred-to limitations and drawbacks.

These objects of the invention and advantages thereof will become more apparent from a consideration of the specific steps involving my novel manufacturing process set forth below more in detail.

The first step consists in forging a block of metal, e.g., rolled steel, roughly into the intended shape, i.e., the shape of a lamination guide casing. The first or forging step resulting in the formation of an unworked piece also includes making an appropriate hole into the flat bottom or end surface of the part intended to be shaped into a lamination guide casing. It will be understood that the dimensions of that forging must substantially exceed the dimensions of the ultimate or finished lamination guide casing.

Next the forging is placed into a die, or forging die, and subjected therein to such pressure as to compress it substantially to the size the finished lamination guide casing is intended to have. The size of the foregoing as it leaves the forging press may slightly exceed the dimensions intended for the finished part.

It will be apparent that this way of shaping the workpiece without machining avoids impairment of the grain of the structure at the transition zone from the flat bottom or end surface to the lateral torque-transmitting fingers. In other words, the grain is gently bent 90 degrees rather than abruptly interrupted, or cut, as by machining. In the finished product the thickness of the flat bottom or end surface ought to exceed the thickness of the torque-transmitting fingers. This is achieved by compressing in the forging press the torque-transmitting finger portions of the workpiece to a higher degree than the flat bottom or end portions thereof. This, in turn, imparts a particularly high mechanical strength to the torque-transmitting finger portions.

After having been subjected to pressure in a forging die the workpiece may be slightly machined or turned on a lathe to improve the surface characteristics thereof. It will be apparent that such machining has no effect upon the polarization of the grain in the workpiece, or the geometry of the grain.

The next step in making lamination guide type casings according to this invention consists in rounding the torque-transmitting fingers at the ends thereof immediately adjacent the flat bottom or end portions of the workpiece, or adjacent the roots of the torque-transmitting fingers. This is achieved by stamping circular holes into the lateral or cylindrical surface of the workpiece, or by drilling such holes into that surface. It will be apparent that this process has no adverse effect upon the grain structure of the workpiece as established by previous forging operations.

Thereafter those portions of the lateral or cylindrical surface of the workpiece which are situated between contiguous torque-transmitting fingers are removed from the workpiece. Removal of these portions from the workpiece is, in part, effected by stamping. The width of the stampings stamped out from the cylindrical surface of the workpiece is less than the distance between the centers of circular contiguous holes made by the preceding stamping or drilling operation, and the apertures formed by that stamping operation are symmetrical with regard to a straight line interconnecting adjacent centers of contiguous holes made by the preceding stamping or drilling operation.

It will be apparent that by the stamping operation described in the preceding paragraph only a portion of the lateral or cylindrical surface of the workpiece situated between contiguous finger portions thereof is being removed. Hence the next step involves the removal of excess material still present between contiguous finger portions of the workpiece. This is achieved by means of a machine tool having very fine cutting teeth, e.g., a milling cutter having very fine teeth. To be more specific, this is achieved by means of a pair of gang-operated spaced rotatable saw-like or milling-cutter-like machine tools having very fine teeth, being very thin in axial direction and rotatable about a common axis of rotation which is arranged parallel to the flat bottom or end portion of the workpiece. These machine tools are moved radially inwardly into the workpiece while rotating and thus performing their cutting operation, the direction of feed of these two machine tools being at right angles to the portion of the lateral or cylindrical surface of the workpiece situated between the two machine tools. Using such tools for machining the lateral surfaces of the torque-transmitting fingers results in smooth edges or flank thereon which do not require subsequent machining, e.g., subsequent grinding. Even if by some unfortunate circumstance chatter marks should be formed, such marks can but extend in a direction substantially longitudinally of the torque-transmitting fingers, or in axial direction, this being the direction in which cutting is effected by the pair of gang-operated cutters, and such chatter marks have no adverse effects upon the freedom of motion in axial direction of the torque-transmitting lamination engaging said fingers.

The common axis of rotation of the above referred-to gang-operated machine tools, or milling cutters, should preferably be arranged in the center region between the end of the lateral or cylindrical surface of the workpiece remote from the flat bottom or end portion thereof and the circular holes which are formed in that surface by the aforementioned punching or drilling operation. The spacing between the cutting edges of the pair of gang-operated machine tools, or milling cutters, used for slicing certain portions out of the workpiece ought to exceed the distance between the near ends of the aforementioned circular holes in the workpiece, and to be less than the distance between the far ends of these circular holes, and the exact spacing required for the cutting edges of the gang operated machine tools or milling cutters will become more apparent from a consideration of the next or final step involved in the process of making lamination guide type casings.

This final step consists in hardening the lateral edges or flanks of the torque-transmitting fingers. Hardening of these edges or flanks is achieved by a local or surface hardening process, e.g., induction hardening. Hardening is only effected to such a depth of the edges or flanks of the torque-transmitting fingers that the inner boundary line of each hardening zone forms substantially a tangent to the aforementioned circular holes or rounded portions of the torque-transmitting fingers, thus leaving unhardened the roots proper of said fingers. Consequently there is no tendency at the roots of the fingers to crack as a result of the hardening thereof, and thus to impair the mechanical strength of the torque-transmitting fingers where these fingers are subjected to the most severe duty, or the most severe stresses.

In some instances it may be desirable to modify the sequence of steps set forth above as indicated below. The step of punching or drilling circular holes into the lateral or cylindrical surface of the workpiece may be followed immediately by the cutting operation performed with a pair of fine gang-operating milling cutters, or like tools, and the portions of the workpiece situated between contiguous finger portions may thereafter be removed from the workpiece by a punching or shearing operation severing punchings along a line which is parallel to the lines interconecting the centers of contiguous holes in the lateral or cylindrical surface of the workpiece.

It will be apparent from the foregoing that the process according to this invention minimizes time consuming machining operations and that the scrap formed when carrying the process according to this invention into effect is mostly in the form of sizable valuable stampings rather than small chips.

It is, therefore, another object of this invention to provide a method for making lamination guide type casings for disc clutches, disc brakes, etc. which is more economical than comparable prior art processes.

Further objects of this invention will become apparent as the following description proceeds, and the features of novelty which characterize the invention will be pointed out with particularity in the claims annexed to, and forming part of, this specification.

For a better understanding of the invention reference may be had to the accompanying drawings illustrating the invention wherein:

FIG. 1 is an isometric view of a lamination guide structure manufactured by a predetermined sequence of steps in accordance with the present invention;

FIG. 2a shows a portion of the lateral cylindrical surface of the structure of FIG. 1 developed into the plane of the paper on which FIG. 2a is made;

FIG. 2b shows a modification of what is shown in FIG. 2a in the same fashion as FIG. 2a does;

FIG. 3 is a section along 3—3 of FIG. 2b;

Figure 8:
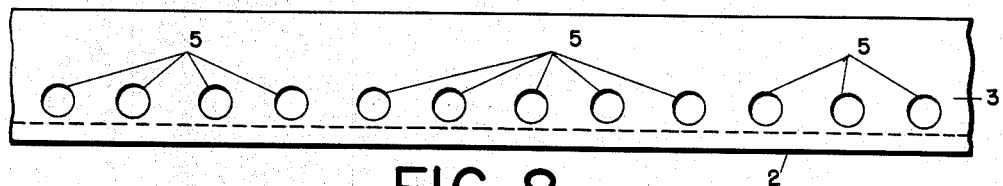
Figure 9:
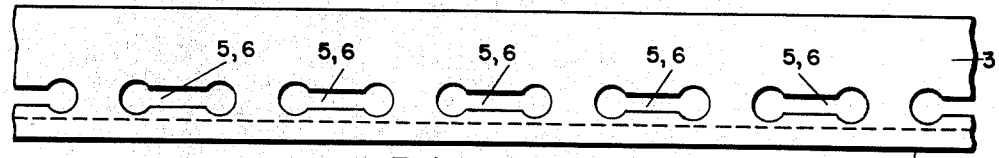
Figure 10:
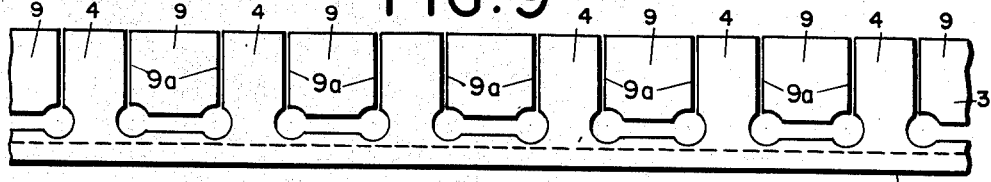
Figure 11:
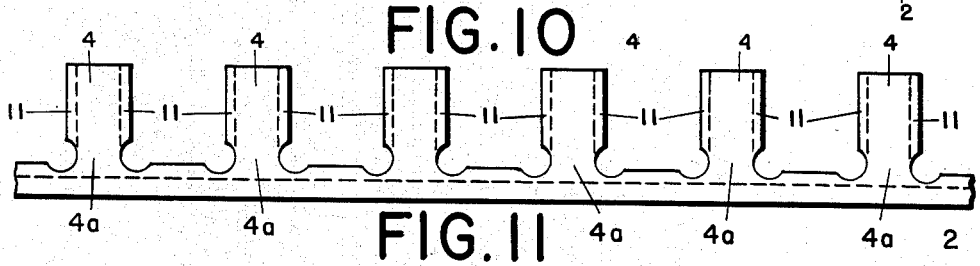

FIGS. 8–13, inclusive, illustrate successive stages in forming the lateral cylindrical surface of the structure of FIG. 1, FIG. 8 showing that surface upon having been provided with a plurality of angularly displaced circular apertures or holes;

FIG. 9 showing that surface upon removal of the material initially present between contiguous pairs of apertures or holes;

FIG. 10 showing that surface after severing the material or surface elements initially present between contiguous fingers of the structure of FIG. 1 from the rest thereof; and FIG. 11 showing that surface upon hardening the juxtaposed narrow surfaces or edges of the fingers of the structure of FIG. 1.

FIGS. 12 and 13 show the lateral cylindrical surfaces of the structure of FIGS. 1 and 2b upon performance of certain operations to be described below more in detail; and FIGS. 14a, 14b and 15 show an electromagnetic clutch comprising a lamination guide structure manufactured according to the present invention, FIG. 14a being a section along 14a—14a of FIG. 15;

FIG. 14b being a section along 14b—14b of FIG. 15;

The upper portion of FIG. 15 being a section along 15—15 of FIG. 14a; and

The lower portion of FIG. 15 being a side elevation seen in the direction of the arrow $R_3$ of FIG. 14b.

Referring now to the drawings, and more particularly to FIG. 1 thereof, the lamination guide structure of casing shown therein comprises a substantially disc-shaped flat circular end surface 2 having a central or coaxial circular aperture 1. The structure of FIG. 1 further comprises a lateral or cylindrical surface 3 whose right end as seen in FIG. 1 is in the form of a plurality of spaced axially extending torque-transmitting fingers 4. These fingers 4, of which six are shown in FIG. 1, are intended to engage corresponding recesses in the torque-transmitting laminations of a disc clutch, or disc brake, and to guide these laminations in axial direction when the latter are selectively spaced, or compressed.

In FIG. 2a showing a portion of the lateral cylindrical surface 3 developed into the plane of the paper on which FIG. 2a is drawn the contours of the finished product are shown in heavy solid lines and the contours of the scrap formed incident to manufacturing lamination guide structures of FIG. 1 have been indicated by solid but less heavier lines.

Figures 4, 5, 6, 7:
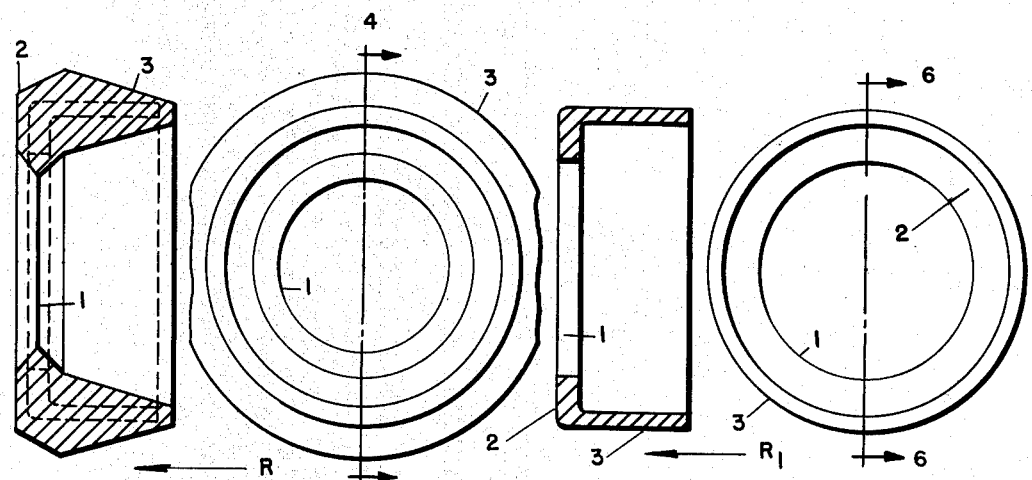
FIG. 4 is a section of a rough forging taken along 4—4 of FIG. 5.
FIG. 5 is a view of the same forging as illustrated in FIG. 4 seen in the direction of the arrow R of FIG. 4.
FIG. 6 shows the same forging as shown in FIG. 4 upon having been pressed in a forging die and is a section along 6—6 of FIG. 7.
FIG. 7 is a view of the same structure as illustrated in FIG. 6 seen in the direction of the arrow $R_1$ of FIG. 6.

Initially a block of metal, e.g., rolled steel, is forged to roughly assume the shape of a lamination guide casing. Such a forging is shown in FIGS. 4 and 5. The solid lines in FIGS. 4 and 5 are indicative of the initial shape of the forging and the dotted lines in FIG. 4 refer to the shape to be ultimately given to the forging. The first above-mentioned forging step is followed by die forging the workpiece shown in FIGS. 4 and 5 to take the shape shown in FIGS. 6 and 7. Thereupon circular holes 5 having a predetermined peripheral spacing, or circular pitch, are drilled, or punched, into the cylindrical lateral surface 3 of the workpiece as clearly indicated in FIGS. 2a and 8. The next step consists in removing stampings 6 from cylindrical surface 3 (FIG. 2a). Stampings 6 are bounded by two parallel straight edges 6a and two circular edges 6b. FIG. 9 shows the lateral cylindrical surface 3 of the workpiece subsequent to performance of the stamping operations by which the scrap stampings 6 are removed from the workpiece. The composite reference character 5, 6 has been applied in FIG. 9 to indicate the composite apertures or holes in the lateral cylindrical surface 3 of the workpiece obtained by the aforementioned stamping operations.

The next step consists in complete removal of excess material between contiguous fingers 4, i.e., removal of the substantially square portions 9 from the lateral cylindrical surface 3. This is achieved by an operation in the nature of a milling operation or sawing operation performed with a pair of rotating gang-operated tools having fine teeth and a small width in the direction of the shaft upon which these tools are mounted. The width of these tools is sufficiently small to impart to these tools more or less the character of a circular saw. In FIG. 2a reference character 8 has been applied to indicate the narrow strips of material removed by these saw-like milling cutters. FIG. 10 shows the narrow gaps 9a formed by the operation of the aforementioned saw-like milling cutters.

In FIG. 3 reference numerals 7' and 7" have been applied to indicated two consecutive positions of the rotating tools used for severing the portions 9 of the lateral surface 3 from the latter, thus leaving but the spaced torque-transmitting fingers 4 thereof. As indicated in FIG. 3 the direction of the feed of the cutting tools or milling tools is substantially radially inwardly toward the longitudinal axis of the workpiece. It will be apparent from FIG. 3 that the axis of rotation of the two rotating gang-operated cutting tools used for forming gaps 9a is arranged parallel to the flat bottom portion 2 of the workpiece at a level substantially midway between the ends of fingers 4 remote from flat bottom portion 2, and the ends of the fingers 4 adjacent to flat bottom portion 2. It is further apparent from FIG. 3 that the diameter of the cutting tools should preferably exceed the length of the cuts to be performed. The direction of the feed of the cutting tools is substantially at right angles to the surface element 9 to be severed by a pair of incisions 9a simultaneously cut into the cylindrical lateral surface 3.

The last step of the process involves a local or surface hardening of the torque-transmitting edges or flanks of fingers 4. In FIG. 2a reference numeral 11 has been applied to indicate the hardening zones and the depth thereof. The inner boundary surfaces of the hardening zones 11 are substantially tangential to the holes 5, leaving the roots 4a of the torque-transmitting fingers 4 unhardened. This has been clearly shown in FIGS. 2a as well as 11.

Referring now to FIG. 2b concerning a modification of the sequence of some of the above described steps, the initial steps are the same as described in connection with FIGS. 2a and 4–8, inclusive. However, the structure of FIG. 8 is further processed by cutting narrow slits into it, thus removing the narrow areas indicated in FIG. 2b by reference character 8. As a result, the portions 10 of the lateral surface 3 are entirely severed from the workpiece, except along lines X—X. FIG. 12 shows the workpiece upon having been cut in a direction longitudinally of torque-transmitting fingers 4, i.e., provided with slits 9a. Thereupon sections 10 are punched off, or sheared off, along lines X—X. In FIG. 13 the portions to be punched-off, or sheared-off, have been indicated by dash-and-dot lines and solid lines indicate in that figure the final configuration of the workpiece. The workpiece shown in FIG. 13 is then locally hardened as described in connection with FIG. 2a and indicated in FIG. 2b by reference character 11.

Thus FIGS. 1–13, inclusive, illustrate the various steps involved in two modifications of the manufacturing process according to this invention. FIGS. 14a, 14b and 15 are concerned with an application of a structure manufactured in accordance with this invention.

Referring now to FIGS. 14a, 14b and 15, numeral 101 has been applied to indicate an element which is fixed in space. Fixed element 101 is made of a magnetizable material and has an annular recess 101a into which a toroidal magnetizing winding 102 is inserted. Winding 102 is intended to be energized by a D.-C. power supply (not shown). To this end winding 102 is provided with a pair of insulated terminals of which but one is shown in the drawing. Numeral 103 has been applied to indicate that terminal.

Fixed element 101 is mounted on composite driving element 105. Driving element 105 comprises two parts as clearly shown in FIG. 15, this being necessary to allow proper assembly of the structure. The radially inner portion of driving element 105 defines a cylindrical bore 105a adapted to receive a rotatable shaft (not shown) driven by some appropriate motor means such as, for instance, an electric motor (not shown). The shaft to be inserted into bore 105a is keyed at 105b to the radially inner portion of driving element 105, or secured to the same in an equivalent fashion, so as to preclude relative rotation between said shaft and the radially inner portion of driving element 105, and to compel transmission of a torque from said shaft to the radially inner portion of driving element 105. Numeral 105b has been applied to indicate a groove for keying said shaft to the radially inner portion of driving element 105. Mounted on the radially inner portion of driving element 105 is a pair of roller bearings 104 for supporting fixed magnetizable element 101. The cylindrical radially inner surface of the latter engages the radially outer raceways of roller bearings 104.

The radially outer portion of driving element 105 is provided with a system of gear teeth 106 extending in a direction longitudinally of bore 105a and of the shaft intended to be received by said bore. Reference numerals 108, 112 have been applied to indicate a system or stack of laminations comprising radially inner laminations 108 alternating with radially outer laminations 112. Radially inner laminations 108 are provided on their radially inner sides with a system of gear teeth in cooperative engagement with the system of gear teeth 106 formed by the radially outer portion of driving element 105. Laminations 108 and 112 are slidable in a direction longitudinally of the system of gear teeth 106, but laminations 108 cannot be rotated relative to driving element 105.

Reference numeral 110 has been applied to indicate a thrust plate adapted to receive axial thrust forces. Thrust plate 110 is substantially annular and secured by means of studs 124 to driving element 105, thus forming an integral part of driving element 105. The outer diameter of thrust plate 110 ought to be at least as large as the outer diameter of laminations 108.

Reference numeral 113 has been applied to indicate a casing or laminations guide structure made by the combination of steps set forth above in considerable detail in connection with FIGS. 1–13. Guide structure 113 includes six axially extending fingers 114 of which each engages a cooperating recess in radially outer lamination 112. The torque imparted by a driving shaft to driving element 105 is transmitted by laminations 112 to guide structure 113 provided laminations 108 and 112 are firmly pressed together by an axial force or thrust, precluding relative movement between laminations 8 and 12.

It will be understood that the operation of the clutch of FIGS. 14a, 14b and 15 may be reversed in which case guide structure 113 is being power-driven, and part 105 is then the driven rather then the driving element of the clutch.

Reference numeral 118 has been applied to indicate a rotatable armature for compressing the stack of laminations 108 and 112. Armature 118 is acted upon by the electromagnetic field set up by toroidal D.-C. energized magnet winding 102. When winding 102 is energized armature 118 moves from lift to right, as seen in FIG. 15, thereby compressing laminations 108 and 112. Armature 118 is slidingly supported by a sleeve 109 of non-magnetizable material. The fact that sleeve 109 is made of non-magnetizable material controls the proper geometry of the magnetic flux generated by winding or coil 102, i.e., it minimizes the leakage flux, and maximizes the ratio between useful flux and leakage flux. Armature 118 is clamped against thrust plate 110 by means of a plurality of tension elements 120 each comprising a conical portion 120a engaging armature 118, an intermediate portion 120b and a screw 120c engaging a female screwthread in the intermediate portion 120b. Intermediate portions 120b of tension elements 120 project through cylindrical passageways in thrust plate 110 and through cylindrical passageways 105a in driving element 105 and the heads of screws 120c rest against an annular pressure plate 121. Tension elements 120 transmit the magnetic forces acting upon armature 118 to pressure plate 121 and cause joint axial movements of armature 118 and pressure plate 121. The radially outer surface of pressure plate 121 is screw-threaded and supports an internally screw-threaded annular nut 122. By rotating nut 122 the latter may be moved selectively to the right, or the left, of pressure plate 121, as seen in FIG. 15. Nut 122 is adapted to abut against the stack of laminations 108, 112 upon energizing of winding or coil 102, and movement of armature 118 and pressure plate 121 toward fixed element 101. It is important to fix the position of nut 122 relative to pressure plate 121 in such a fashion as to preclude unintentional changes of that position during successive duty cycles of the clutch, i.e., during repeated energization and de-energization of winding 102. To this end nut 122 is provided with a radial slot (not shown) and tightening screw 123 projects from one side of said slot transversely across said slot to the other side of said slot. When tightening screw 123 is loose, nut 122 may readily be rotated and simultaneously moved in axial direction to the right or left, as desired, but when tightening screw 123 is tightened and the width of the aforementioned radial slot in screwnut 122 minimized, then the position of screwnut 122 relative to pressure plate 121 is made unalterable.

It may be necessary, or desirable, to interpose spring means (not shown) between pressure plate 121 and driven element 105 to reset pressure plate 121—i.e., to move pressure plate 121 from right to left—following each de-energization of toroidal winding or coil 102.

It will be understood that my invention is not limited to manufacturing lamination guide structures for exactly the same clutch as shown in FIGS. 14a, 14b and 15 and described in connection therewith. This invention is applicable to manufacturing lamination guide structures for any clutch having multiple laminated discs, or so-called multiple disc clutches. So-called disc brakes are predicated on the same operating principles as disc clutches and comprise basically the same elements and this invention is, therefore, also applicable for manufacturing lamination guide structures for disc-brakes.

It will be apparent to anyone skilled in the art that this invention is not limited to the exact process illustrated in FIGS. 1–13 of the drawings and described in connection therewith.

Having disclosed preferred ways of carrying my invention into effect, it is desired that the same not be limited to the particular embodiments disclosed. It will be obvious to any person skilled in the art that many modifications and changes may be made without departing from the broad spirit and scope of the invention. Therefore it is desired that the invention be interpreted as broadly as possible and that it be limited only as required by the prior state of the art.

I claim as my invention:

1. A process for manufacturing lamination guide casings having a substantially flat bottom portion defining a central aperture and having a substantially cylindrical lateral portion projecting at right angles from said bottom portion for use in disc-clutches, disc brakes, and like apparatus, said process comprising in combination the steps of:
    (a) die forging a block of metal to roughly impart to it the shape of a lamination guide casing;
    (b) thereafter further compressing said block by die forging and thereby more closely imparting to said block the shape of a lamination guide casing;
    (c) machining into said lateral portion a plurality of equidistant circular holes having a predetermined circular pitch;
    (d) removing additional material from said lateral portion to form a plurality of spaced axially extending torque-transmitting fingers out of said lateral portions, said removing of additional material including simultaneously making pairs of axially extending incisions in said lateral portion by a pair of gang-operated cutting tools, each of said pairs of incisions being spaced to intersect with a pair of said plurality of circular holes; and
    (e) of locally hardening the edge zones of said plurality of fingers extending in a direction longitudinally thereof while leaving the root zones of said plurality of fingers unhardened.

2. The process specified in claim 1 comprising the step of compressing said lateral portion by die forging to a greater extent than said bottom portion, thereby imparting a smaller wall thickness to said lateral portion than to said bottom portion.

3. The process specified in claim 1 wherein said local hardening is effected to but such a depth that the inner boundary layer of the hardening zone extends substantially tangentially to said circular holes.

4. A process for manufacturing lamination guide casings having a substantially flat bottom portion defining a central aperture and having a substantially cylindrical lateral portion projecting substantially at right angles from said bottom portion for use in disc clutches, disc brakes and like torque-transmitting apparatus, said process comprising in combination the steps of:
    (a) die forging a block of rolled stock substantially into the shape of a lamination guide casing;
    (b) machining into the lateral portion of said block upon die forging thereof a plurality of equidistant circular holes having a predetermined circular pitch;
    (c) removing by punching the material present between pairs of contiguous circular holes;
    (d) making by a pair of gang-operated cutting tools pairs of axially extending incisions into the lateral portion of said block each intersecting with one pair of contiguous circular holes to form a plurality of radially spaced axially extending torque-transmitting fingers; and
    (e) thereafter locally hardening the edge zones of said plurality of torque-transmitting fingers extending in a direction longitudinally thereof while leaving the root zones of said plurality of torque-transmitting fingers unhardened.

5. A process for manufacturing lamination guide casings having a substantially flat bottom portion defining a central aperture and having a substantially cylindrical lateral portion projecting substantially at right angles from said bottom portion for use in disc clutches, disc brakes and like torque-transmitting apparatus, said process comprising in combination the steps of:
    (a) die forging a block of rolled stock substantially into the shape of a lamination guide casing;
    (b) machining into the lateral portion of said block upon die forging thereof a plurality of equidistant lateral holes having a predetermined circular pitch;
    (c) making by means of a pair of gang-operated cutting tools pairs of axially extending incisions into the lateral portion of said block each intersecting with one pair of said lateral holes;
    (d) cutting from the lateral portion of said block sections thereof situated between pairs of axially extending incisions to form a plurality of spaced axially extending torque-transmitting fingers; and
    (e) thereafter locally hardening the edge zones of said plurality of fingers extending in a direction longitudinally thereof while leaving the root zones of said plurality of fingers unhardened.

References Cited by the Examiner

UNITED STATES PATENTS

| 1,613,058 | 1/1927 | Sauer et al. | 29—148.4 X |
| 1,958,025 | 5/1934 | Styri. | |
| 2,177,303 | 10/1939 | Murden | 29—148.4 X |
| 2,911,268 | 11/1959 | Staunt | 29—148.4 X |
| 2,913,811 | 11/1959 | Benson | 29—148.4 |
| 3,124,877 | 3/1964 | Macchini | 29—556 X |

WHITMORE A. WILTZ, *Primary Examiner.*